US012698186B2

(12) United States Patent
Lanz et al.

(10) Patent No.: US 12,698,186 B2
(45) Date of Patent: Aug. 4, 2026

(54) CONSTRUCTION ARRANGEMENT OF AN ELEVATOR AND A METHOD

(71) Applicant: Kone Corporation, Helsinki (FI)

(72) Inventors: Otto Lanz, Helsinki (FI); Matti Rasanen, Helsinki (FI); Markku Haapaniemi, Helsinki (FI); Anssi Venho, Helsinki (FI); Janne Laine, Helsinki (FI); Mika Ijas, Helsinki (FI); Mikko Kukkola, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/434,160

(22) Filed: Feb. 6, 2024

(65) Prior Publication Data

US 2024/0182268 A1 Jun. 6, 2024

Related U.S. Application Data

(63) Continuation of application No. PCT/EP2021/073645, filed on Aug. 26, 2021.

(51) Int. Cl.
*B66B 11/00* (2006.01)
*B66B 11/02* (2006.01)

(52) U.S. Cl.
CPC ...... *B66B 11/0005* (2013.01); *B66B 11/0206* (2013.01)

(58) Field of Classification Search
CPC ............. B66B 11/0005; B66B 11/0206; B66B 19/002; B66B 19/005
See application file for complete search history.

(56) References Cited

U.S. PATENT DOCUMENTS 6,164,418 A * 12/2000 Chen ........................ B66B 19/00 187/361
7,108,100 B2 * 9/2006 Stingl ..................... E04G 1/367 248/235

(Continued)

FOREIGN PATENT DOCUMENTS

CN 108689275 A 10/2018
EP 2636629 B1 5/2015

(Continued)

OTHER PUBLICATIONS

International Search Report and Written Opinion of the International Searching Authority for International Application No. PCT/EP2021/073645 dated Apr. 20, 2022.

(Continued)

*Primary Examiner* — Minh Truong
*Assistant Examiner* — Michelle M Mudwilder
(74) *Attorney, Agent, or Firm* — Harness, Dickey & Pierce, P.L.C.

(57) ABSTRACT

A construction arrangement of an elevator, includes a hoistway, a protection deck arranged within the hoistway for protecting the portion of the hoistway below it from falling objects, wherein the protection deck includes a frame mounted on stationary structure of the hoistway, and a cover co-operating with the frame and extending across the hoistway, and wherein the cover protects the hoistway from falling objects and/or water from falling into the hoistway below it. The frame may be increased and/or decreased in size, individually in at least one direction in relation to the corresponding adjacent stationary structure, such as wall, of the hoistway, without dismantling the frame. A method for constructing an elevator includes mounting a protection deck within a hoistway.

16 Claims, 5 Drawing Sheets

(56) References Cited

U.S. PATENT DOCUMENTS

| | | | | |
|---|---|---|---|---|
| 8,141,683 | B1 * | 3/2012 | Wurth | E04G 1/367 182/223 |
| 8,616,340 | B2 * | 12/2013 | Peacock | B66B 19/00 52/741.1 |
| 8,646,576 | B2 * | 2/2014 | Wurth | E04G 5/10 182/116 |
| 8,714,306 | B2 * | 5/2014 | Iturbe Beristain | E04G 21/3247 182/138 |
| 10,294,076 | B2 * | 5/2019 | Wurth | B66B 5/04 |
| 11,053,098 | B2 * | 7/2021 | Christen | B66B 19/00 |
| 2010/0155184 | A1 * | 6/2010 | Sirigu | B66B 5/0087 187/314 |
| 2012/0291395 | A1 * | 11/2012 | Plathin | B66B 19/02 52/741.1 |
| 2013/0233655 | A1 * | 9/2013 | Peacock | B66B 9/187 187/414 |
| 2014/0000987 | A1 * | 1/2014 | Peacock | B66B 9/187 187/414 |
| 2015/0307322 | A1 * | 10/2015 | Peacock | B66B 7/064 187/254 |
| 2016/0332845 | A1 * | 11/2016 | Kere | E04G 3/28 |
| 2017/0050822 | A1 | 2/2017 | Wurth et al. | |
| 2018/0354753 | A1 | 12/2018 | Hägg et al. | |
| 2018/0362298 | A1 * | 12/2018 | Roussel | B66B 5/0081 |
| 2019/0193995 | A1 * | 6/2019 | Christen | B66B 11/0005 |
| 2019/0194957 | A1 * | 6/2019 | Wurth | E04G 1/367 |
| 2019/0241399 | A1 * | 8/2019 | Kattainen | B66B 1/28 |
| 2020/0277164 | A1 | 9/2020 | Fauconnet | |
| 2023/0002191 | A1 * | 1/2023 | Antonio Da Silva | B66B 5/0081 |

FOREIGN PATENT DOCUMENTS

| | | | |
|---|---|---|---|
| EP | 3388379 | A1 | 10/2018 |
| JP | H1179602 | A | 3/1999 |
| JP | 3328172 | B2 | 9/2002 |
| WO | WO-2011048255 | A1 | 4/2011 |
| WO | WO-2018166980 | A1 | 9/2018 |

OTHER PUBLICATIONS

Chinese Office Action dated Mar. 6, 2026 in corresponding Chinese patent Application No. 2021801017031.

* cited by examiner

CONSTRUCTION ARRANGEMENT OF AN ELEVATOR AND A METHOD

CROSS-REFERENCE TO RELATED APPLICATION

This application is a continuation of PCT International Application No. PCT/EP2021/073645 which has an International filing date of Aug. 26, 2021, the entire contents of which are incorporated herein by reference.

FIELD OF THE INVENTION

The invention relates to a construction arrangement of an elevator and to a method, and particularly to construction time protection of persons and/or components located in a lower portion of a hoistway of an elevator. The elevator is preferably an elevator for transporting passengers and/or goods.

BACKGROUND OF THE INVENTION

When an elevator or a building surrounding it is under construction, there may be installation workers in the lower parts of the elevator hoistway carrying out construction work. Also, the lower parts of the hoistway may already be in construction-time transport use. During construction, there is an increased risk of objects falling into the lower parts of the hoistway. For example, tools or construction material may fall into the hoistway. Persons and components located in the lower parts of the hoistway must be protected from falling objects.

One known technique to improve construction process efficiency is a construction-time use CTU elevator with a temporary machine room that can be moved, in other words jumped, upwards as construction progresses. The CTU elevator, such as a jump-lift, enables a faster and safer construction process, earlier closing of the facade, reduced down-time, and safer transportation in all weather conditions. The construction-time elevator enables that construction of the elevator hoistway and elevator installations may continue at higher floors while the elevator is already operating in the same elevator hoistway at the lower floors, below a protection deck that may be called a crash deck in the midway of the hoistway.

The protection deck such as the crash deck above the elevator allows the use of the elevator during construction-time and protects the running elevator. A construction-time elevator system may comprise multiple crash decks on top of each other a distance from each other. When the structure of the building rises, the crash deck is moved a few floors up.

Prior art protection decks have been disclosed in documents EP2636629 B1 and EP3388379 A1, for example.

A drawback of known solutions has been that they have been relatively complicated, and a lot of rearranging has been needed during the process during progress of the construction.

SUMMARY OF THE INVENTION

The object of the invention is to introduce an improved construction time arrangement of an elevator and a method for constructing an elevator. An object is to introduce a solution by which one or more of the above defined problems of prior art and/or drawbacks discussed or implied elsewhere in the description can be solved.

It is brought forward a new construction arrangement of an elevator, comprising: a hoistway; a protection deck arranged within the hoistway for protecting the portion of the hoistway below it from falling objects; wherein the protection deck comprises: a frame mounted on stationary structure of the hoistway; a cover co-operating with the frame and extending across the hoistway, wherein the cover is adapted to protect the hoistway from falling objects and/or water from falling into the hoistway below it. The frame of the protection deck is, without dismantling it, configured to be increased and/or decreased in size, individually in at least one direction in relation to the corresponding adjacent stationary structure, such as a wall, of the hoistway.

It is also brought forward a new method for constructing an elevator comprising mounting a protection deck within a hoistway for protecting the portion of the hoistway below it from falling objects; wherein the protection deck comprises: a frame mounted on stationary structure of the hoistway; a cover co-operating with the frame and extending across the hoistway, wherein the cover is adapted to protect the hoistway from falling objects and/or water from falling into the hoistway below it. The frame of the protection deck is, without dismantling it, configured to be increased and/or decreased in size, individually in at least one direction in relation to the corresponding adjacent stationary structure, such as a wall, of the hoistway.

Advantageously the invention provides a non-parametric protection deck solution for variable hoistway dimensions. Thus, the protection deck is adjustable and re-usable and supports sustainability in construction.

Preferable further details of the invention are introduced in the following, which further details can be combined individually or in any combination.

According to some embodiments the frame is configured to be increased and/or decreased in size in width direction in relation to the corresponding adjacent stationary structure of the hoistway. According to some embodiments the frame is configured to be increased and/or decreased in size in length direction in relation to the corresponding adjacent stationary structure of the hoistway.

According to some embodiments the cover of the protection deck is, without dismantling it, together with the frame, configured to be increased and/or decreased in size, individually in at least one direction in relation to the corresponding adjacent stationary structure such as the wall of the hoistway.

Preferably the protection deck is individually size adjustable substantially in four directions at sides of four stationary structures of the hoistway, a first side wall, a second side wall opposite to the first side wall, a front wall, and a back wall opposite to the front wall.

The adjustability of the protection deck allows to move and install the protection deck in the hoistway in variable height positions where the width and/or the length of the hoistway may be larger or smaller than in a previous location of the protection deck, without substantially dismantling the protection deck. Advantageously the protection deck can be assembled from side wall to side wall and from front wall to back wall in the hoistway, and further lifted in the hoistway without dismantling.

In a preferred embodiment the protection deck frame is stretchable and contractable to form an outermost frame perimeter shape which differs from a rectangular shape. One advantage of this is that size anomalies and size deviations in a constructed hoistway or in a hoistway to be retrofitted do not harm the assembly of the protection deck.

According to some embodiments the frame comprises frame corners formed of two neighbouring frame beams connected to each other via a corner fixing element or directly, for example via a bolt or pinion fixing. Preferably the frame beams are adjustable in length. Preferably four frame beams form substantially the perimeter shape of the frame when assembled to each other.

Preferably the frame comprises joints between beams to allow an articulated movement of the beams in the frame in relation to each other. The frame may comprise joints between the frame beams and the support beams; and between neighbouring frame beams, to allow an articulated movement of said beams in relation to each other.

Preferably the frame comprises corner joints to allow an articulated movement of the frame beams in relation to each other. The corner fixing element may comprise the joint, and the frame beams may be assembled to the corner fixing element. The joint may be a bolt in a hole joint. The joint may be constituted of an auxiliary hinge. The hole may be oversized in comparison to the bolt to enable a play. A kind of swivel connection of the frame beams may be enabled by a predetermined movement gap in the assembly between two frame beams.

Preferably the frame comprises support beams between the frame beams such that the support beams are connected at their ends to two opposite frame beams. Preferably the support beams are adjustable in length. Preferably the frame comprises support beam joints to allow an articulated movement of the support beams in relation to the frame beams.

The length adjustability of the frame beams and the support beams, together with the articulating corner joints and support beam joints makes it possible to stretch and/or contract the frame in a shape deviating from a substantially rectangular shape. Preferably the adjusting operation can be done without dismantling the frame.

According to some embodiments the protection deck is suitable for hoistway layouts with dimensions ranging from 1600 mm×2000 mm to 3200 mm×3200 mm. According to some embodiments the arrangement comprises at least one elevator unit movable in the hoistway, including at least an elevator car. According to some embodiments the elevator arrangement covers elevator solutions ranging from 630 kg to 1600 kg.

Since the deck frame can be lifted upwards and/or downwards inside the shaft without dismantling the construction, the overall installation time shortens and thus the costs are lowered. According to some embodiments this is possible by using a suitable hoisting point tool. According to some embodiments lifting of the deck in the hoistway is performed with a dedicated light-weight tool on an upper landing or an upper landing sill from upper floors or hooks in the stationary structures of the hoisting point hoistway. The light weight of the hoisting point tool makes the installation easier, and the tool may be mounted on upper positions as the construction proceeds and the building rises.

According to some embodiments the protection deck frame is designed to co-operate with, among others, hoisting tools. Use of non-parametric frame co-operating with a related preferably non-parametric cover makes it possible to move the deck and/or change the size of the deck in variable hoistway dimensions and layouts without dismantling the protection deck.

According to some embodiments the arrangement comprises a first hoisting apparatus for hoisting construction material below the protection deck. According to some embodiments the first hoisting apparatus is supported by the protection deck, and the first hoisting apparatus comprises a first hoisting machine mounted on the protection deck, and a first flexible tension member movable with the first hoisting machine.

According to some embodiments the arrangement comprises a second hoisting apparatus for hoisting a load below the protection deck supported by the protection deck, said load preferably being an installation platform or a movable machine room of an elevator located below the protection deck or an elevator car below the protection deck. According to some embodiments the second hoisting apparatus comprises a second hoisting machine and a second flexible tension member movable with the second hoisting machine.

Said stationary structures may be opposite vertical wall faces of the hoistway. In a preferred embodiment the frame is mounted to the four hoistway corners formed of the two pairs of opposite vertical wall faces of the hoistway. In a preferred embodiment the arrangement comprises corner anchoring interfaces to be attached to hoistway corners. The hoistway corners are formed of two neighbouring stationary structures of the hoistway such as the walls of the hoistway. Preferably the protection deck frame comprises corner fixing elements to be attached to the anchoring interfaces. Preferably the corner fixing elements are designed to reduce drilled fixing elements and number of holes in the walls of the hoistway.

In a preferred embodiment the frame comprises at least in one frame corner a lifting connector, such as a hook or an eye or a gripper, allowing lifting of the deck, which connectors preferably are integrated with the corner fixing elements.

According to some embodiments the frame comprises at least one center support fixing element to be attached to the structure between two adjacent hoistway corners, and preferably to be used at least when the dimension between two adjacent hoistway corners exceeds above a predetermined value.

In a preferred embodiment, the arrangement comprises at least one further protection deck mounted within the hoistway for protecting the portion of the hoistway below it from falling objects. The at least one further protection deck may be a horizontal protection deck configured to be used as a crash deck. The at least one further protection deck may be a diagonally aligned or deflected protection deck configured to be used as top protection deck. Preferably the diagonally aligned or deflected protection deck is disposed at an upper/top height as the building rises or a top region of the hoistway constructed so far.

According to some embodiments the frame comprises retractable and contractable frame beams which preferably are angular adjustable. In a preferred embodiment two substantially parallel frame beams fixed together with a plurality of cross beams mainly form the frame. According to some embodiments the protection deck comprises engagement members to be engaged with a first side and second side of the hoistway, which first and second side are opposite sides of the hoistway. The first engagement member may be called sill fixture for engagement of the protection deck with the sill of a landing. Preferably the first engagement member is connected pivotally to the lower part of the frame and the second engagement member is connected pivotally to the upper part of the frame. In mounted state of the protection deck in the hoistway the first engagement member may rest again the sill of the landing and the second engagement member is engaged with the opposite wall. According to some embodiments the protection deck comprises at least one pivotable bridge safety balustrade on one side or both sides of the frame, the balustrade acting as a pivotable side frame of the protection deck when turned from the vertical position 90 degrees over the hoistway. Preferably the frame beams and support beams are retractable and contractable.

According to some embodiments the cover comprises several different shaped sections slightly overlapping each other. In a preferred embodiment the cover material comprises biomaterial. In a preferred embodiment the cover material comprises biocomposite such as polymer resin and biofiber. Preferably the cover material is recyclable. In a preferred embodiment the cover comprises a honeycomb structure comprising a biomaterial comb construction.

The invention provides a solution by which construction time protection and material hoisting can be provided safely and simply. Further the invention provides a non-parametric protection deck solution for variable hoistway dimensions. In a non-parametric design, the protection deck fits in various shaft/hoistway layouts and covers a large portion of volume elevator hoistway dimensions requirements. Also, the invention provides adjustable construction for different hoistway sizes. Further the invention allows reducing the number of anchoring bolts for the protection deck and related holes to the stationary structures such as walls of the hoistway. Further with the invention support cavities or pockets in the stationary structure of the hoistway are avoided. Further the protection deck may be adapted elevator platforms regardless the layout requirement or dimensions of elevator layout. Further the invention allows increasing re-usability and retro fitting of the protection deck and supports sustainability. Advantageously the protection deck as a whole and/or the protection deck frame can be moved upwards and downwards in the hoistway of the elevator without dismantling it, preferably by using suitable hoisting point tool. Further the invention allows reducing cost in material and installation. Installation time can be saved, and earlier commissioning of an elevator can be achieved.

Further with the invention working ergonomics can be enhanced.

BRIEF DESCRIPTION OF THE DRAWINGS

In the following the present invention will be described in closer detail by means of preferred embodiments with reference to the attached drawings, in which.

DETAILED DESCRIPTION

Figure 1:
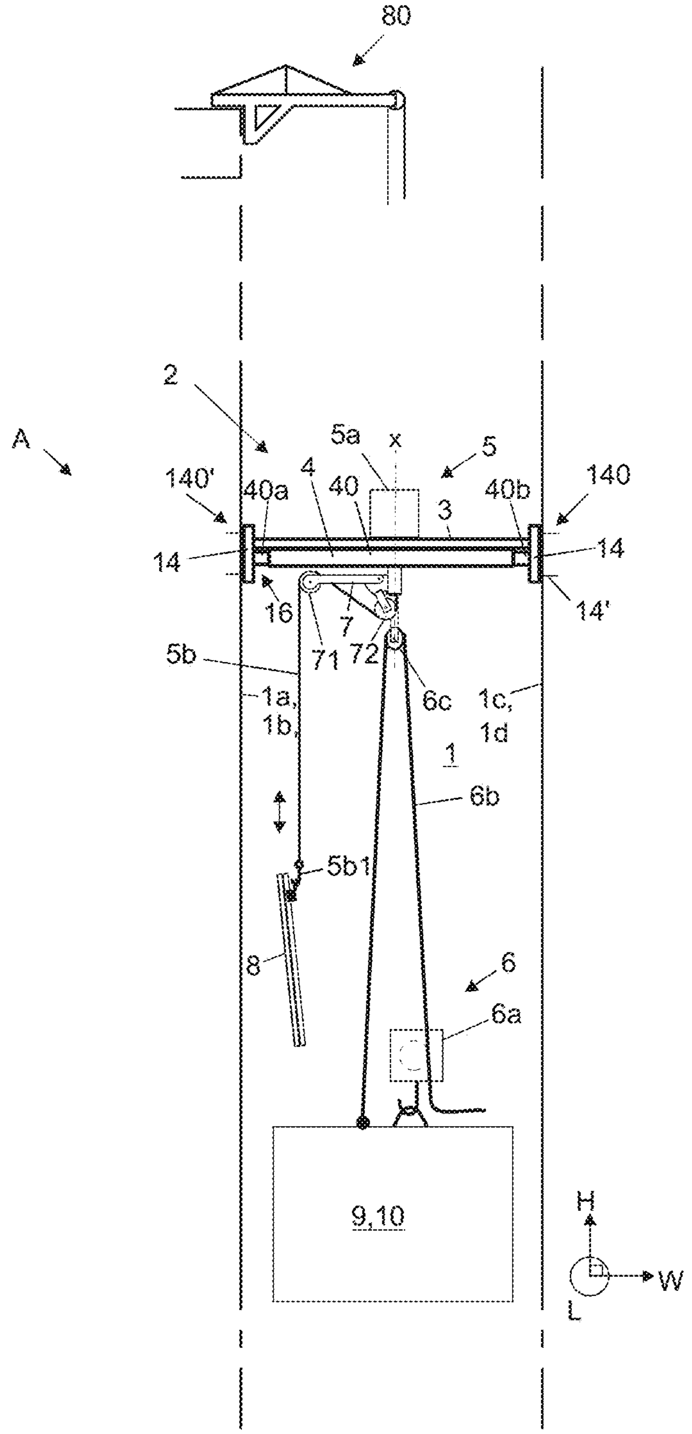
FIG. 1 illustrates schematically a construction arrangement of an elevator comprising a protection deck mounted in a hoistway in a building.

FIG. 1 illustrates a construction arrangement A of an elevator comprising a hoistway 1 formed inside a building, and a protection deck 2 mounted within the hoistway 1 for protecting the portion of the hoistway 1 below the protection deck 2 from falling objects. The protection deck 2 comprises a frame 4 mounted on walls 1*a*-1*d* of the hoistway 1. The protection deck 2 comprises a cover 3 co-operating with the frame and extending substantially horizontally across the hoistway 1. The cover 3 is adapted to protect the hoistway 1 from falling objects and/or water from falling into the hoistway below it. The frame 4 is, without dismantling it, configured to be increased and/or decreased in size, individually in at least one direction in relation to the corresponding adjacent wall 1*a*, 1*b*, 1*c*, 1*d* of the hoistway 1. Preferably the frame is configured to be increased and/or decreased in size, individually in a first, a second, a third or a fourth direction within the hoistway 1. Preferably the frame is, without dismantling it, configured to be increased and/or decreased in size, individually in each direction in relation to the corresponding adjacent stationary structure of the hoistway.

In FIG. 1 the cover 3 is mounted on the frame 4. Preferably the cover is, without dismantling it from the frame, together with the frame, configured to be increased and/or decreased in size, individually in at least one direction in relation to the corresponding adjacent wall 1*a*, 1*b*, 1*c*, 1*d* of the hoistway 1. Preferably the cover is configured to be increased and/or decreased in size, individually in a first, a second, a third or a fourth direction within the hoistway 1.

Preferably the size of the frame 4 and the cover 3 can be increased and/or decreased substantially in a first and/or a second direction across the hoistway 1, and additionally the size of the frame 4 and the cover 3 can be increased and/or decreased substantially in a third and/or fourth direction, substantially orthogonal to the first and second directions, across the hoistway 1. The first and second directions may be called width direction W (forward and backward width direction) of the hoistway, and the third and fourth direction may be called length direction L (forward and backward length direction) of the hoistway.

The protection deck 2 comprises a first hoisting apparatus 5 for hoisting construction material below the protection deck 2. The first hoisting apparatus 5 is supported by the protection deck 2. The first hoisting apparatus 5 comprises: a first hoisting machine 5*a* mounted on the protection deck 2, preferably in particular on the frame 4 thereof; and a first flexible tension member 5*b* movable with the first hoisting machine 5*a*.

As illustrated in FIG. 1, the first flexible tension member 5*b* hangs suspended by the first hoisting machine 5*a*, and the first flexible tension member 5*b* is provided with a connector 5*b*1 at a lower end thereof, such as a hook for example, connected or connectable with a construction material 8 to be hoisted. In the arrangement of FIG. 1, the connector 5*b*1 is connected with a construction material 8 to be hoisted, which construction material 8 is a guide rail section.

The frame 4 is mounted to four hoistway corners 1*a*/1*b*, 1*b*/1*c*, 1*c*/1*d* and 1*d*/1*a* formed of the two pairs of opposite vertical wall faces 1*a*, 1*c* and 1*b*, 1*d* of the hoistway. The construction arrangement comprises corner anchoring interfaces 14 which are attached to said corners of the hoistway 1. The frame 4 comprises four corner fixing elements 11 (shown in FIGS. 2 and 5) which are attached to co-operating anchoring interfaces 14. Optionally the corner fixing elements 11 can be fixed straight to the face of the hoistway.

Figure 2:
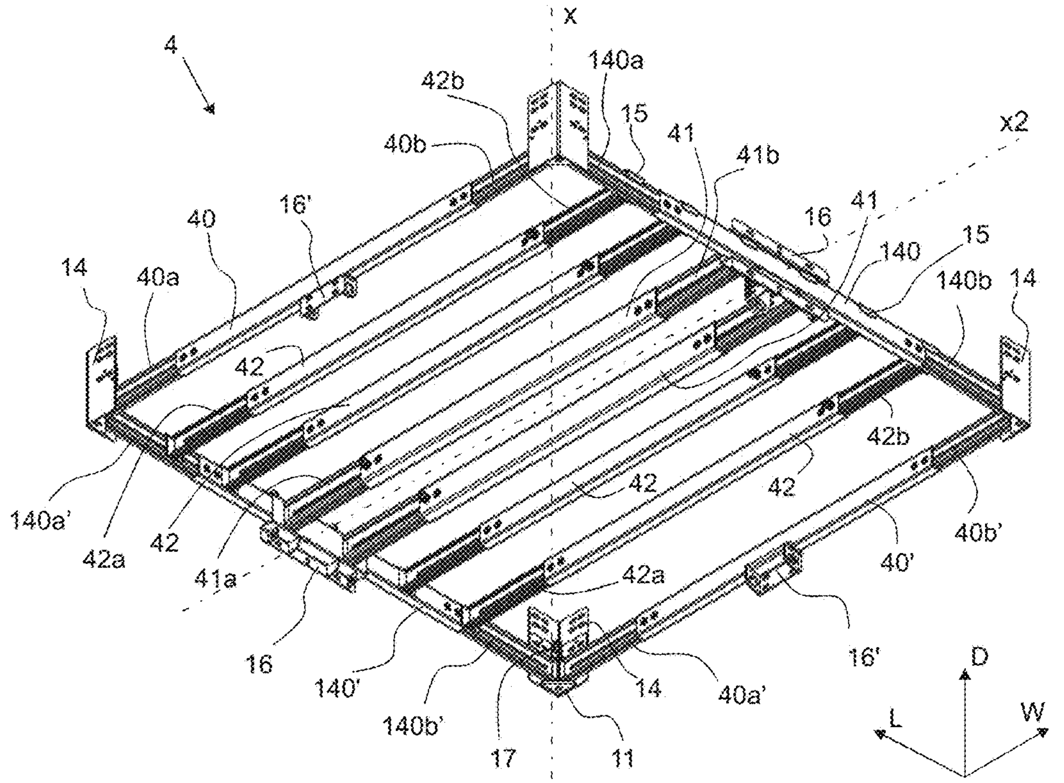
FIG. 2 illustrates details of the protection deck of FIG. 1 from below, and with anchoring interfaces.

The frame 4 comprises frame corners, each formed of two neighbouring frame beams 40*a*, 40, 40*b*; 140*a*, 140, 140*b*; 40*b*', 40', 40*a*'; 140*b*', 140', 140*a*' connected to each other via a corner fixing element 11 (FIG. 2). The frame beams are length adjustable. The shown four frame beams form substantially the perimeter shape of the frame when they are assembled to each other over the corner fixing elements 11.

The frame 4 comprises first support beams 41*a*, 41, 41*b* and second support beams 42*a*, 42, 42*b* between the frame beams 140*a*, 140, 140*b*; 140*b*', 140', 140*a*' such that the support beams are connected at their ends 15 to two opposite frame beams. The support beams are length adjustable. The support beam end 15 is constructed for example as a fork resting on the supporting frame beam to allow minor assembly work.

Figure 5:
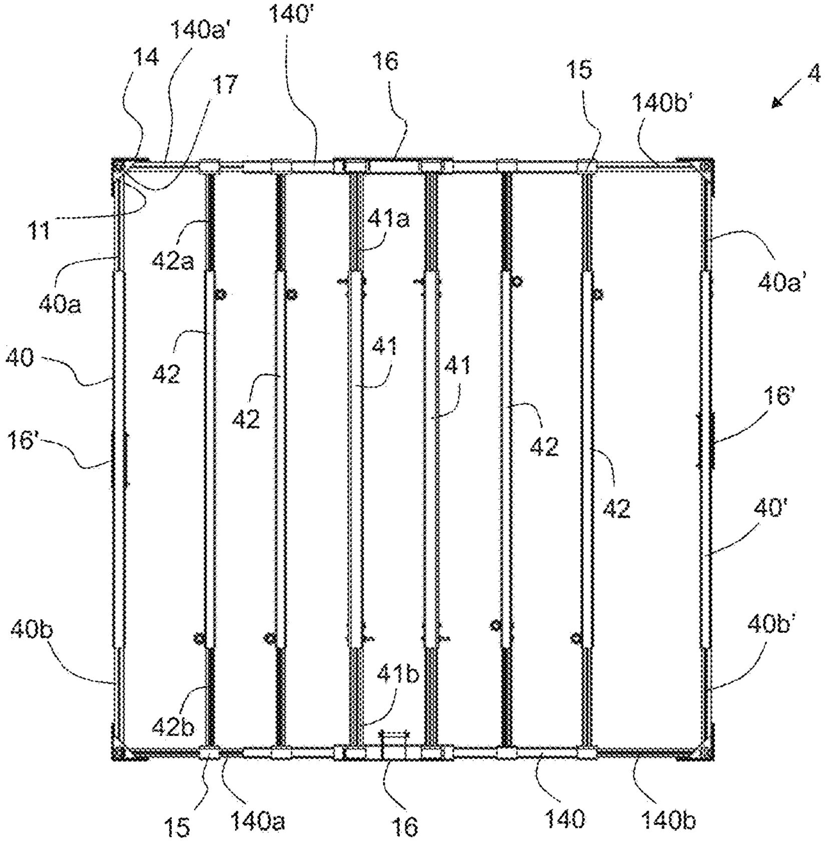
FIG. 5 illustrates a top view of the protection deck of FIG. 2.

As shown in FIGS. 2 and 5, the frame 4 comprises in the corners a lifting connector 17, for example a hook or an eye or a gripper, allowing lifting of the deck 2, which connectors 17 are integrated with the corner fixing elements 11. Hoisting of the protection deck in the hoistway may be performed with a dedicated hoisting point tool 80 on an upper landing or an upper landing sill from upper floors in the building. Further the protection deck 2 may be hoisted using another protection deck aligned in the same hoistway above, particularly using a top protection deck 2' explained later in this description.

The width and length of the frame 4 is preferably adjustable. Features facilitating adjustability have been disclosed in detail in FIGS. 1-5. For the adjustability purpose, the frame 4 comprises a plurality of frame beams 40*a*, 40, 40*b*; 140*a*, 140, 140*b*; 40*b*', 40', 40*a*'; 140*b*', 140', 140*a*' oriented substantially horizontally (i.e. their longitudinal axes are horizontal) and such that the longitudinal axes of the first frame beams 40*a*, 40, 40*b*; 40*b*', 40', 40*a*' are substantially parallel with width direction W of the hoistway 1, and longitudinal axes of the second frame beams 140*a*, 140, 140*b*; 140*a*', 140', 140*b*' are substantially parallel with length direction L of the hoistway 1. For the adjustability purpose, the frame 4 further comprises at least two first support beams 41*a*, 41, 41*b* and optionally second support beams 42*a*, 42, 42*b* oriented substantially horizontally (i.e. their longitudinal axes are horizontal) and such that the longitudinal axes of the first and second support beams are substantially parallel with width direction W of the hoistway 1. The upper faces of all said beams are substantially on the same vertical level for supporting the bottom support face of the cover 3. The first and second support beams are connected at their ends 15 to two opposite second frame beams 140, 140'.

The frame 4 comprises at least one second support beam, preferably 2 to 10, such as four as illustrated in FIGS. 2 and 5.

The protection deck 2 comprises a supporting beam 7 connected pivotally to the frame 4, and a diverting wheel 71 mounted on said supporting beam 7. The flexible tension member 5*b* is guided to pass from the hoisting machine 5*a* to the diverting wheel 71, over it and from the diverting wheel 71 downwards in the hoistway 1. The supporting beam 7 is more specifically connected to the frame 4 preferably pivotally around a vertical axis x as well as around a horizontal axis x2 relative to the frame 4. Preferably the location of the diverting wheel 71 relative to the frame is adjustable by pivoting the supporting beam 7 around said axis x and/or said axis x2. The protection deck 2 comprises a second diverting wheel 72 for guiding the flexible tension member 5*b* to pass from the hoisting machine 5*a* to the diverting wheel 71.

The height adjustable protection deck 2 with auxiliary equipment is used as movable installation tool for hoisting of large loads such as: an installation platform or a movable machine room of an elevator located below the protection deck 2 or an elevator car 60 below the protection deck 2. For this purpose, the arrangement comprises a second hoisting apparatus 6 for hoisting a load 9, 10 below the protection deck 2 supported by the protection deck 2, said load preferably being an installation platform 9 or a movable machine room 10 of an elevator located below the protection deck 2, for example. The second hoisting apparatus 6 comprises a second hoisting machine 6*a* and a second flexible tension member 6*b* movable with the second hoisting machine 6*a*. A diverting wheel 6*c* has been mounted on the protection deck 2 for guiding and supporting the second flexible tension member 6*b*. This also enables mounting of the hoisting machine 6*a* separate from the protection deck 2. In the embodiment of FIG. 1, the second hoisting machine 6*a* is mounted on the load 9, 10 and the second flexible tension member 6*b* passes around the diverting wheel 6*c*.

The frame 4 is constructed of preferably telescopic beams fixed to the wall with dedicated wall fixings which can locate on every wall, but the corners are preferred to reduce amount of anchor bolts 14'. Preferably the anchor bolts 14' extend into holes of the wall of the hoistway 1, which hoistway wall preferably comprises concrete.

The first and second frame beams comprise a mid-section 40, 40'; 140, 140', a first end section 40*a*, 40*a*'; 140*a*, 140*a*' and a second end section 40*b*, 40*b*'; 140*b*, 140*b*'. Said frame beam end sections are longitudinally slidable within the frame beam mid-section to form a retractable and contractable frame beam. Correspondingly the first and second support beams comprise a mid-section 41; 42, a first end section 41*a*; 42*a* and a second end section 41*b*; 42*b*. Said support beam end sections are longitudinally slidable within the support beam mid-section to form a retractable and contractable support beam, in particular such that the ends 15 of the end sections extend out from the inner space of the mid-section. Naturally according to the concept of the invention at least one of the frame beams and support beams explained above and hereinafter may consist of two or three or four or more than four beam sections, to form a retractable and contractable beam, and is constructed longitudinally movable in direction of the beam, irrespective if any preceding section is arranged inside or outside or adjacent relative to the next section.

Preferably the first support beams 41*a*, 41, 41*b* are disposed in the center region of the frame area and are preferably designed heavier than the second support beams. The second support beams may be lighter for cover 3 load bearing. The first support beams 41*a*, 41, 41*b* are optimized for load bearing purpose. Preferably the first support beams are constructed for center bearing loads induced from hoisting equipment supported by the protection deck, such as installation platform support and lifting point interface support.

Optionally the arrangement comprises at least one center support fixing element 16, 16' arranged to fix at least one frame beam to the supporting structure of the hoistway 1. In FIG. 2, the first center wall support fixings 16 are adapted to surround the second frame beam mid-sections 140, 140' and can be anchored directly to the wall. FIG. 5 shows optional second center wall support fixings 16' assembled to the first frame beam mid-sections 40, 40'. The second center wall support fixing 16' can be anchored directly to the wall. Further, an optional center counter support part (not shown in Figures) may be assembled to the wall in support to the second center wall support fixing 16'. The second center wall support fixing 16' may be fastened to said center counter support part. The center wall support fixings are used for example when beam span widens above predetermined value.

A preferred preparatory or first installation of the frame comprises: drilling anchoring interfaces 14 to hoistway corners and/or walls; installing corner fixing elements 11 to the anchoring interfaces 14 and optional center support counter support parts; lifting frame beams to corner fixing elements 11; installing the load bearing first support beams 41*a*, 41, 41*b* in the center area to the frame beams and center support fixing elements 16, 16'; connecting the light weight second support beams 42*a*, 42, 42*b* to the frame beams; fixing the frame beams to corner fixing elements 11; and installing the lifting connectors such as hooks 17 to frame corners. After this first installation the frame may be lifted without dismantling to variable heights when the fixing elements 11 loosened from the anchoring interfaces 14.

The frame 4 is layered with protective cover 3 to prevent falling objects entering to the lower part of the shaft where a CTU elevator is operating.

Structure and materials of the sheet coverings 3 are designed to fit in different elevator shaft layout configurations and retain required strength to resist impacts of possible falling objects and projectiles from above during shaft mechanics and elevator etc. installation which proceeds to upper floors while elevator operates in shaft below, under the deck.

The cover 3 is designed to fit various layout configurations. The protective cover is installed on the frame 4 inside the elevator shaft.

The cover 3 comprises several different shaped sections slightly overlapping each other. The cover 3 comprises a base plate 3.1 on the middle between the frame beams and the cover can be size optimized in upcoming design rounds. Preferably the base plate comprises two neighboring wings cooperating with each other so that objects are avoided to fall below the cover. The base plate 3.1 may comprise an opening 3.1' in the middle area of the cover to form installation base for equipment to be mounted on beams such as the first support beams. Further said opening may be used for the flexible tension member 5*b* which is guided downwards in the hoistway 1.

The cover 3 comprises adjustable first sections 3.2; 3.12 that are configured to move or slide in horizontal level to two separate degrees of freedom. The first sections are overlapping the base plate 3.1 and are disposed at the corner areas of the overall structure of the protection deck 2. In detail of the FIG. 3, the first sections are illustrated having upwards facing grooved surfaces 3.2*a*; 3.12*a*, a first surface in the length direction Land a second surface in the width direction W.

The cover 3 comprises adjustable second sections 3.3, 3.4; 3.13, 3.14 that are configured to move or slide adjustably along the first sections 3.2; 3.12 such that they overlap the base plate 3.1. Generally, the first and second sections are adjustably and detachably interlocked by grooves or different forms of mechanical solutions. Preferably the cover is configured to fit for current volume platforms, from 630 kg to 1600 kg elevators.

Figure 3:
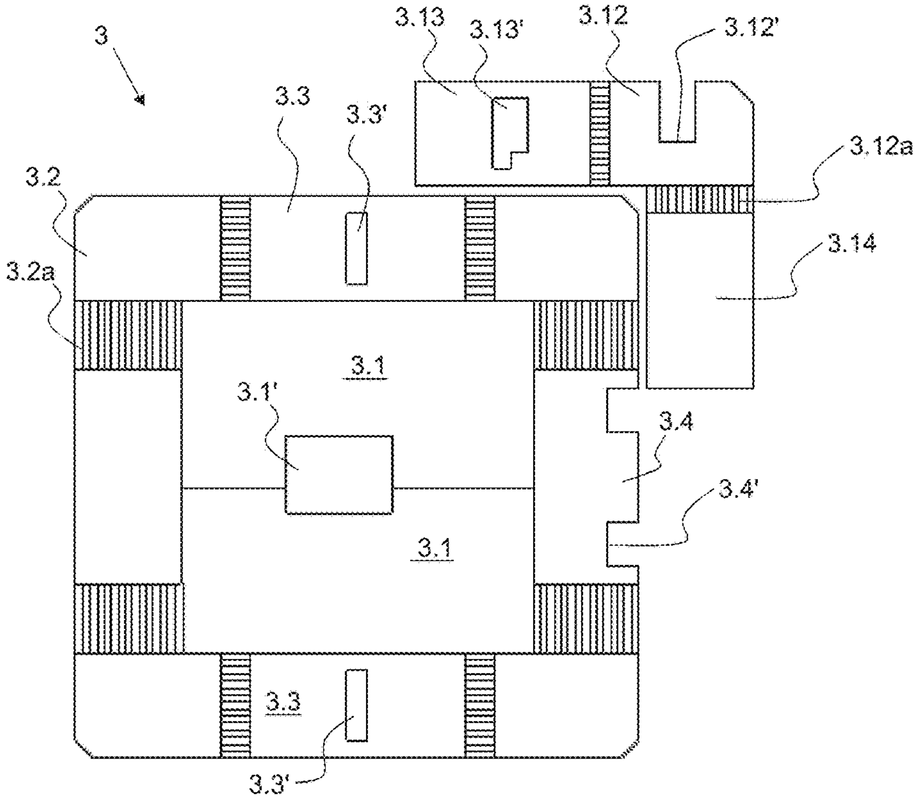
FIG. 3 illustrates exemplary cover structures.
Figure 4:
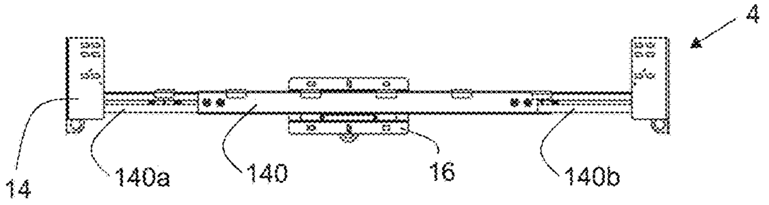
FIG. 4 illustrates a side view of the protection deck of FIG. 2.

In detail of FIG. 3 it is shown that the explained cover 3 construction is advantageously suitable for both side-counterweight and back-counterweight type elevators. For a back-counterweight type elevator in a first example the cover 3 shown as a whole comprises first openings 3.3' for guide rails in the opposite second sections 3.3, and second openings 3.4' for back-counterweight technology in the back second section 3.4. For a side-counterweight type elevator in a second example the cover 3 shown in part comprises third openings 3.13' for guide rails in the opposite second sections 3.13, and fourth openings 3.12' for side-counterweight technology in two neighbouring first sections 3.12. As explained above, the cover 3 can be optimized further to fulfil requirements of different elevator platforms. Preferably the sections are light weight and can be assembled in sections which makes the installation easier.

In prior art crash deck covers for example steel plates are used. Also, glass fiber mesh and polycarbonate on steel frame have found use. A known crash deck, the so-called builders deck is hand made of wood material. The cover will be bound to some wear and tear during the usage and will be replaced if damaged. This means with prior solutions unrecyclable waste or usage of heavy weight material.

According to some preferred embodiments the cover 3 material is recyclable, in particular recyclable biomaterial. Preferably the cover material is biodegradable. Crash deck cover sheet provides protection against possible falling projectiles in elevator shaft during shaft mechanic etc. installation. Such protective plates may be replaced after predetermined interval, instead steel frame has a very long shelf life.

According to some preferred embodiments the cover 3 material comprises biocomposite such as polymer resin and biofiber. A biocomposite is a composite material formed by a matrix (resin) and a reinforcement of natural fiber. Preferred biomaterials for the cover are listed hereinafter:

- flax fiber+biopolymer matrix (e.g. polyhydroxyalkanoate (PHA), polylactic acid (PLA), and starch or lipid-derived polymers, furandicarboxylic acid (FDCA) and muconic acid)
- hemp fiber+biopolymer matrix
- sisal+biopolymer matrix
- biofiber+degradable polymer matrix
- biofiber+traditional, nontoxic polymer (disposal by burning).

Advantages achieved with selecting biomaterial as cover material 3 are among others: recyclability, upcycling, downcycling, disposal by decomposition, disposal by burning, light weight and improved strength properties, such as impact resistance, easier installation due to reduced weight which leads to cost savings, waste reduction, renewability, and sustainability.

In more detail, flax and hemp reinforcements can be used to create composites, as a function of the process used. They provide: low density (1.5 vs. 2.54 for glass fiber), higher specific stiffness than for glass fiber, better vibration damping than for carbon or glass fiber, better thermal insulation than for carbon fiber, better acoustic insulation than for carbon or glass fiber, good impact response, good fatigue behavior, biodegradability, radio wave transparency, and good hybridization properties.

Preferably the cover 3 may be strengthened by weaving a metal wire mesh into the matrix, if needed also protective layer of gelcoat may be applied to surface for better life span.

Figure 6:
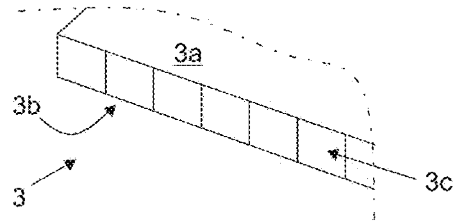
FIG. 6 illustrates a sheet material of a cover.

FIG. 6 shows an example of a cover 3 material with a biofiber comb construction. The cover material has a top work face 3*a* and a bottom support face 3*b*, and a honeycomb structure 3*c* between the top and bottom surfaces. This kind of structure provides a lightweight but stiff cover 3 material ready to confront impacts against the protection deck 2, 2'.

Figure 7:
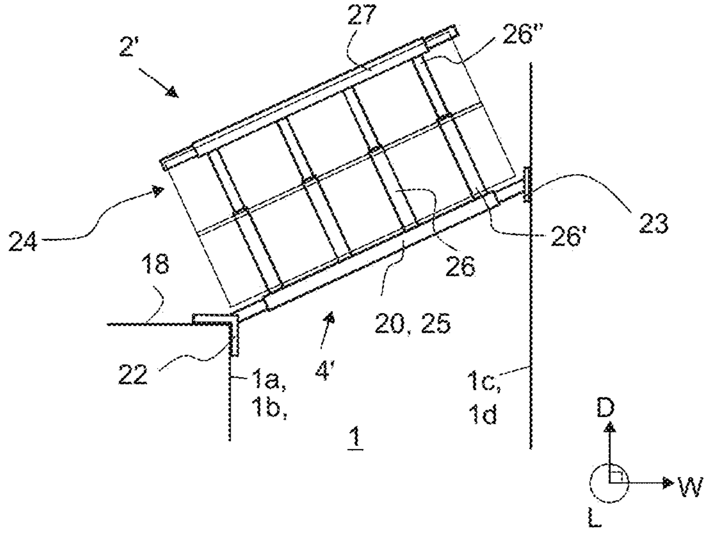
FIG. 7 illustrates schematically a construction arrangement of an elevator comprising a protection deck installed diagonally within the hoistway in top region of the hoistway constructed so far.
Figure 8:
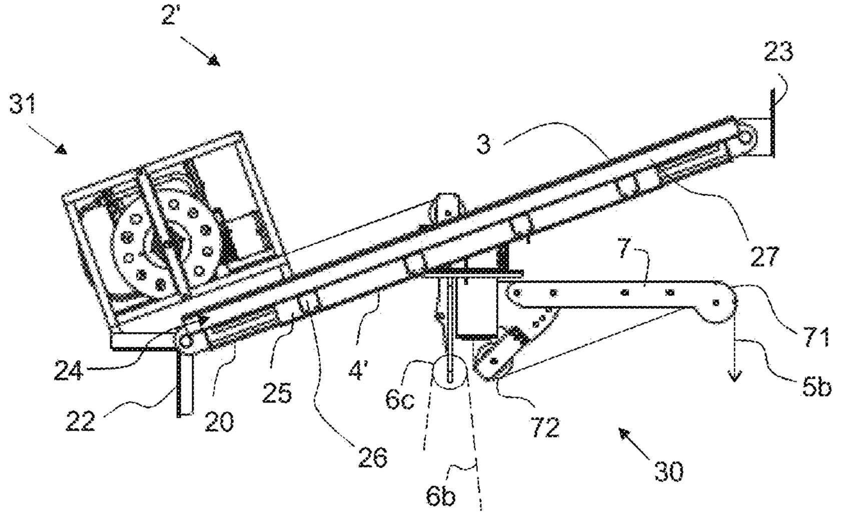
FIG. 8 illustrates in detail the protection deck of FIG. 7 equipped with a lifting interface.

FIGS. 7 and 8 illustrate a second protection deck 2' preferably mounted within the hoistway 1 in top region of the hoistway constructed so far. The second protection deck 2' may be called top protection deck 2'. The elements showed in FIGS. 1-6 are lower than the parts showed in FIG. 7, so these are not shown in FIG. 7. The second protection deck 2' may be in the same hoistway 1 as the horizontally aligned protection deck 2 explained along FIGS. 1-6, or within another hoistway. Further the protection deck 2' shown in FIG. 8 is equipped with a lifting interface 30 and an optional third hoisting apparatus 31 (for example a TIRAK hoist) for an elevator installation below the protection deck 2' such as the first hoisting apparatus 5 described in connection with FIG. 1 (for example a TIRAK hoist). Further, the lifting interface 30 is suitable for lifting the protection deck 2' inside the hoistway using a hoisting point tool 80 above the top protection deck 2' (see also FIG. 1). Further, the hoisting point tool 80 may be used for hoisting the protection deck 2 configured as a horizontally aligned crash deck, as shown in FIG. 1.

In FIGS. 7 and 8 the construction arrangement of an elevator comprises a hoistway 1 formed preferably inside a building, and a second protection deck 2' mounted in the top region within the hoistway 1 for protecting the portion of the hoistway 1 below the protection deck 2' from falling objects and fluids during installation in an unfinished building construction. The protection deck 2' comprises a frame 4', 24 mounted on stationary structure of the hoistway, particularly on a sill of a landing 18 and on an opposite wall 1*c* of the hoistway 1. The protection deck 2' comprises a cover 3 co-operating with the frame and extending diagonally across the hoistway 1. The top protection deck 2' is resting in an inclined position against the fixed structures of the hoistway and is able to redirect or deflect falling material for minimizing an impact of the falling object. The cover 3 is adapted to protect the hoistway 1 from falling objects and/or fluids such as water or concrete from falling into the hoistway below it. The frame 4' is, without dismantling it, configured to be increased and/or decreased in size, individually in at least one direction in relation to the corresponding adjacent stationary structure 18, 1*c* of the hoistway. Preferably the frame is, without dismantling it, configured to be increased and/or decreased in size, individually in each direction in relation to the corresponding adjacent stationary structure of the hoistway.

Prior art topmost hoistway protection and weather proofing deck is mainly constructed on site by builder. Builders deck are usually various beam constructions or wooden beams with top layer composed of veneer or similar. The deck itself is handmade and built for purpose only just to be transformed into waste after dismantling it. Builders decks cannot be used for installation or as lifting interface.

Further, prior art protection deck or platform may be a steel construction of two separate decks placed on beams crossing from the door sill to separate pockets in back wall. Pockets are order bound and must be included in the construction plan of the building. Pockets are fabricated by builder. This type of solution requires planning and co-operation in advance between the elevator supplier frontline and the constructor. If a hoistway specific temporary ceiling or machine room is used to provide lifting interfaces for installation, it will delay the elevator installation work since it is finished last. In current situation different type of scaffolding might be needed in installing the temporary decks.

The frame 4' comprises telescopic adjustable frame beams 20 which preferably are angular adjustable. In a preferred embodiment two substantially parallel frame beams 20 fixed together with a plurality of cross beams mainly form the frame 4'. The protection deck 2' comprises engagement members 22, 23 to be engaged with a first side and second side of the hoistway 1, which first and second side are opposite sides of the hoistway. The first engagement member 22 may be called sill fixture for engagement of the protection deck 2' with the sill of a landing 18. The first engagement member 22 is connected pivotally to the lower part of the frame 4' and the second engagement member(s) 23 is connected pivotally to the upper part of the frame 4'. In mounted state of the protection deck 2' in the hoistway 1 the first engagement member 22 rests again the sill of the landing 18 and the second engagement member(s) 23 is engaged with the opposite wall 1*c*.

The protection deck 2' comprises at least one pivotable bridge safety balustrade 24 on one side or both sides of the frame 4'. The balustrade 24 is acting as a pivotable side frame of the protection deck when turned from the vertical position 90 (shown in FIG. 7) degrees over the hoistway 1. The balustrade 24 comprises: a bottom engagement member 25 coupled pivotably to the frame beam 20; a plurality of telescopic adjustable support beams 26 connected to the bottom engagement member 25 at their first ends 26'; and a top beam 27 which is connected to the second ends 26" of the support beams 26. The frame beams 20 and support beams 26 are retractable and contractable. The protection deck 2' comprises a cover consisting of a plurality of adjustable cover plates. The main frame 4' is covered with an adjustable main cover 3, and the side frames 24 are covered with adjustable side covers. Preferably the main cover 3 and the adjustable side cover are formed of sheet structures configured to move in relation to each other and slightly overlap in relation to each other to form a retractable and contractable cover structure and to protect the hoistway 1 from falling objects and/or fluids from falling into the hoistway below it. Preferably the protection deck 2' comprises sealings arranged to the perimeter regions of the protection deck. In FIG. 8 the protection deck 2' is shown with the balustrade 24 rotated 90 degrees from the position of FIG. 7.

Using the arrangement explained along FIGS. 7-11, the elevator hoistway 1 remains openable from the top as the building core form, and shaft walls precede floor construction when building construction is in progress. After completion needed floors, machine room is built last as it is placed on top of the building.

Design solution of the arrangement explained along FIGS. 7-11 is light weight, low cost, non-parametric and easy to install from the landing. The protection deck 2' may be lifted without dismantling inside the hoistway 1 using specified lifting point interface above the protection deck 2' and the lifting interface 30. No interfaces from the builder are required. All subassemblies of the protection deck 2' may be transported to site on demand using preferably transport boxes designed for this purpose and preferably components are pre-assembled into separate modules. This reduces unnecessary assembly work on construction site. The protection deck 2' is designed to be installed from the door sill on landing. Fixtures are anchored to the door sill and shaft back wall. Regarding example operation of the lifting interface 30 below the protection deck 2' it is referred to the description of FIG. 1, e.g. reference numerals 5*b*, 6*b*, 6*c*, 7, 71, 72.

Preferably the protection deck 2' is used for staged installation of an elevator, for sectional installation of an elevator and for zoned and multi zoned installation of an elevator. The protection deck frame 4' and the protection deck cover 3 are adjustable to suit variable dimensioned elevator hoistway 1. Preferably the adjustability allows to move and mount the protection deck 2' in the hoistway in variable height positions where the width and/or the length of the hoistway may be larger or smaller than in a previous location of the protection deck, without substantially dismantling the protection deck. Advantageously the protection deck 2' can be assembled from side wall to side wall and from front wall to back wall diagonally across the hoistway, and further lifted in the hoistway without dismantling. The diagonal assembly position allows to deflect falling objects away from the hoistway.

Advantageously the preparatory or first installation of the diagonal protection deck 2' begins with sill fixture 22 installation and anchoring. The frame beams 20 are connected to the sill fixture and safety balustrade 24 is mounted. Optional wall brackets 23 may be positioned. The frame beams are turned diagonally across the shaft back wall 1*c* and wall brackets 23 are fixed, additional support may be provided from door frame with lifting hooks and shackles. The balustrade frame 24 is adjusted to suitable position and height and turned 90 degrees above the hoistway below. The covers 3 are fitted on the frame 4', 24 and seams between the protection deck and the surrounding structure are sealed. Sealings are preferably attached to the top beam 27.

Figures 9, 10, 11:
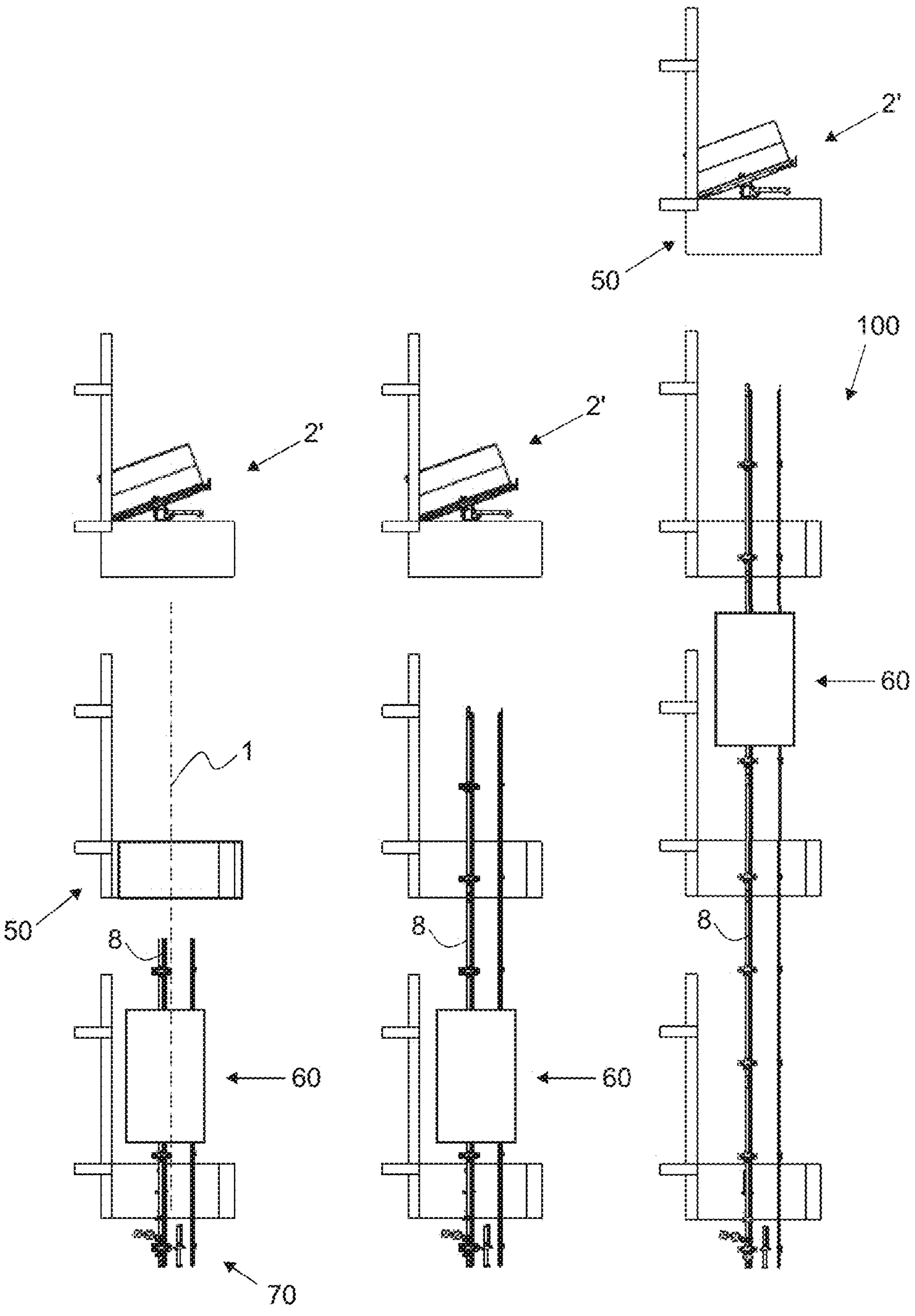
FIGS. 9 to 11 illustrate a construction method during an installation of an elevator within a hoistway as the construction progresses.

Along with FIGS. 9 to 11 there is described a preferred method of using the construction arrangement as the construction of a building 100 progresses, in other words, a staged elevator installation in an early phase of the building construction. The method may be used in connection with zoned and multi zoned construction methodologies and jump-lift technology, construction time usage of elevators, and further in connection with protection of running elevator.

Preferably a specially constructed elevator installation tool package is transported to site and assembled when i.e., the building core structure 50 and hoistway 1 reaches for example mid height >3-4 floors, as shown in FIG. 9. After completing preferred building height, the tools and protective elements are fitted to the elevator shaft.

Installation of the elevator 100 can be commenced several weeks or months before completion of the building construction and interior finalization. The method suggested here will shorten product handover time to end user drastically, though enabling CTU elevator for contractor.

In FIGS. 9 and 10 the building core 50 including elevator hoistway 1 and pit 70 is constructed to 3-4 floors. The method may comprise at least one of the following steps:

- sealing the hoistway 1 from top (3-4th floor), preferably with the top protection deck 2',
- starting the elevator installation by installing mechanical parts in the hoistway 1 and pit 70,
- mounting another protection deck configured as a crash deck 2 below the top protection deck 2',
- assembling counterweight, sling and car 60 of the elevator 100,
- using the car in par with the second hoisting apparatus 6 (explained in FIG. 1) in guide rail 8 installation.

The building reaches permanent height (for example 6-12 floors) during the time previous steps are finished. Further the method may comprise at least one of the following steps, FIG. 11:

- moving the top protection deck 2' to an upper/top height as the building rises, preferably using the hoisting point tool 80,
- phasing hoistway mechanics, electrification doors etc. installation to suitable intervals following the building construction, for example a) halfway building, b) full height building,
- removing the protection deck 2' from the topmost floor and elevator installation is completed.

Further the method may comprise mounting the protection deck 2, also called the first protection deck or crash deck 2 and described along FIGS. 1-5, within the hoistway 1 for protecting the portion of the hoistway 1 below the protection deck 2 from falling objects.

The second hoisting apparatus 6 may be configured to be used with the lifting interface 30 of the second protection deck 2' in top of the hoistway or with the lifting equipment arranged in connection with the crash deck 2 disposed in the hoistway.

The elevator may be commissioned as soon as building has reached final height and hoistway roof is sealed permanently. Elevator installation is ready as soon as building reaches final height and can start serving material and people flow in unfinished building during the construction. This supports and improves over all internal logistics.

According to an embodiment there is provided a staged installation tool package including sufficient and dedicated equipment designed for the purpose of staged elevator installation, including at least one of the following: the non-parametric upper position and top position inclined/deflected/diagonal protection deck 2' equipped with the lifting interface 30; the non-parametric mid hoistway horizontal protection deck called also crash deck 2, the hoisting point tool 80; necessary ad hoc equipment and tools and a suitable transport packaging. Such a tool package improves the installation, site logistics and internal people and material flow of the building, in addition to phased installation in multiple shafts concurrently. Such an installation tool package supports and improves sustainability of the elevator installation.

In the application, several details for the arrangement have been presented as preferred. This means that they are preferred, however they are not to be understood as necessary, because it may be that the arrangement can be implemented also without them.

It is to be understood that the above description and the accompanying figures are only intended to illustrate the present invention. It will be obvious to a person skilled in the art that the invention can be varied and modified without departing from the scope of the invention.

The invention claimed is:

1. A construction arrangement of an elevator, comprising:

a hoistway; and a protection deck arranged within the hoistway for protecting a portion of the hoistway below the protection deck from falling objects, wherein the protection deck comprises a frame mounted on the hoistway, and a cover on the frame and extending across the hoistway, the cover being configured to protect the hoistway from at least one of the falling objects and water from falling into the hoistway below the cover, wherein the frame is configurable to be increased or decreased in size, individually in at least one direction in relation to corresponding adjacent parts of the hoistway, without dismantling the frame, wherein the cover is configured to be increased or decreased in size together with the frame, such that the cover is configured to be increased or decreased in size based on the frame being increased or decreased in size, respectively, in the at least one direction in relation to the corresponding adjacent parts of the hoistway, and wherein the frame comprises frame beams that are connected to each other, and corner anchoring interfaces at respective longitudinal ends of neighboring frame beams from among the frame beams, the corner anchoring interfaces being configured to be detachably anchored to interior corners of the hoistway.

2. The construction arrangement according to claim 1, wherein the frame is configured to be increased or decreased in size in a width direction in relation to the corresponding adjacent parts of the hoistway, and the frame is configured to be increased or decreased in size in a length direction in relation to the corresponding adjacent parts of the hoistway.

3. The construction arrangement according to claim 1, wherein the frame comprises corner fixing elements, and two of the neighboring frame beams from among the frame beams are connected to each other via a corner fixing element from among the corner fixing elements, and the frame comprises at least one lifting connector integrated with the corner fixing element, the at least one lifting connector comprising a hook, an eye or a gripper.

4. The construction arrangement according to claim 3, wherein the frame comprises support beams between the frame beams, the support beams being length-adjustable and having ends connected to two opposite frame beams from among the frame beams, and the frame beams and the support beams comprise at least two beam sections configured to form retractable and contractable beams.

5. The construction arrangement according to claim 4, wherein the frame comprises joints between the frame beams and the support beams, and between neighboring ones of the frame beams, and the joints are configured to enable articulated movement of the frame beams and the support beams in relation to each other.

6. The construction arrangement according to claim 1, wherein the frame beams comprise four length-adjustable frame beams constituting a perimeter shape of the frame when assembled to each other.

7. The construction arrangement according to claim 1, wherein the frame comprises corner fixing elements attached to the corner anchoring interfaces.

8. The construction arrangement according to claim 1, further comprising a hoisting apparatus supported by the protection deck, the hoisting apparatus configured to hoist construction material below the protection deck.

9. The construction arrangement according to claim 1, wherein the construction arrangement comprises a hoisting apparatus supported by the protection deck, the hoisting apparatus configured to hoist a load below the protection deck, and the load comprising an installation platform, a movable machine room of the elevator located below the protection deck, or an elevator car below the protection deck.

10. The construction arrangement according to claim 1, wherein the cover comprises a plurality of different shaped sections slightly overlapping each other, a material of the cover comprises biomaterial which is biodegradable, or a biocomposite comprising polymer resin and biofiber, and the biomaterial comprises a honeycomb structure comprising a biomaterial comb construction.

11. The construction arrangement according to claim 1, wherein the cover comprises a plurality of different shaped sections slightly overlapping each other, the plurality of different shaped sections have grooved surfaces and the plurality of different shaped sections are configured to be slidably adjustable along the grooved surfaces to interlock with each other.

12. A construction arrangement of an elevator, comprising:

a hoistway; and a protection deck arranged within the hoistway for protecting a portion of the hoistway below the protection deck from falling objects, wherein the protection deck comprises a frame mounted on stationary structure of the hoistway, and a cover on the frame and extending across the hoistway, the cover being configured to protect the hoistway from at least one of the falling objects and water from falling into the hoistway below the cover, wherein the frame is configurable to be increased or decreased in size, individually in at least one direction in relation to corresponding adjacent parts of the stationary structure of the hoistway, without dismantling the frame, wherein the cover is configured to be increased or decreased in size together with the frame, such that the cover is configured to be increased or decreased in size based on the frame being increased or decreased in size, respectively, in the at least one direction in relation to the corresponding adjacent parts of the stationary structure of the hoistway, wherein the frame comprises frame beams that are connected to each other, and corner anchoring interfaces at respective longitudinal ends of neighboring frame beams from among the frame beams, the corner anchoring interfaces being configured to be detachably anchored to corners of the stationary structure of the hoistway, and wherein the protection deck comprises at least one pivotable bridge safety balustrade on one side or both sides of the frame, the at least one pivotable bridge safety balustrade being configured as a side frame of the protection deck when turned from a vertical position 90 degrees over the hoistway.

13. The construction arrangement according to claim 12, wherein the protection deck extends diagonally across the hoistway, and the protection deck is configured as a top protection deck and to redirect or deflect falling material from falling into the hoistway below the protection deck.

14. A method for constructing an elevator, the method comprising:

mounting a protection deck within a hoistway for protecting a portion of the hoistway below the protection deck from falling objects, wherein the protection deck comprises a frame mounted on the stationary hoistway, and a cover on the frame and extending across the hoistway, the cover being configured to protect the hoistway from at least one of the falling objects and water from falling into the hoistway below the cover, wherein the frame comprises frame beams that are connected to each other, and the frame is configured to be increased or decreased in size, individually in at least one direction in relation to corresponding adjacent parts of the hoistway, without dismantling the frame, wherein the cover is configured to be increased or decreased in size together with the frame, such that the cover is configured to be increased or decreased in size based on the frame being increased or decreased in size, respectively, in the at least one direction in relation to the corresponding adjacent parts of the hoistway, and wherein the mounting the protection deck comprises attaching corner anchoring interfaces to interior corners of the hoistway, and attaching corner fixing elements at ends of the frame beams of the frame to the corner anchoring interfaces.

15. The method according to claim 14, comprising:

hoisting construction material below the protection deck with a first hoisting apparatus supported by the protection deck; and hoisting a load below the protection deck with a second hoisting apparatus supported by the protection deck, the load being an installation platform, a movable machine room of the elevator located below the protection deck, or an elevator car below the protection deck.

16. The method according to claim 14, wherein the cover comprises a plurality of different shaped sections slightly overlapping each other, the plurality of different shaped sections have grooved surfaces and the plurality of different shaped sections are configured to be slidably adjustable along the grooved surfaces to interlock with each other.

* * * * *